United States Patent [19]

Seyffer

[11] 4,441,686
[45] Apr. 10, 1984

[54] ELECTROHYDRAULIC PRESSURE-REGULATING VALVE

[75] Inventor: Siegfried Seyffer, Stuttgart, Fed. Rep. of Germany

[73] Assignee: Robert Bosch GmbH, Stuttgart, Fed. Rep. of Germany

[21] Appl. No.: 303,015

[22] Filed: Sep. 17, 1981

[30] Foreign Application Priority Data

Dec. 13, 1980 [DE] Fed. Rep. of Germany ....... 3047110

[51] Int. Cl.³ .............................................. F16K 47/08
[52] U.S. Cl. .................................... 251/127; 251/122; 137/528
[58] Field of Search ............... 251/118, 127, 126, 129, 251/122; 137/487.5

[56] References Cited

U.S. PATENT DOCUMENTS 2,704,085 3/1955 Bieger et al. ..................... 251/118 X
2,737,974 3/1956 Renick ............................ 251/126 X
3,791,408 2/1974 Saitou et al. .................... 251/129 X

FOREIGN PATENT DOCUMENTS 55593 12/1938 Denmark ............................ 251/126

Primary Examiner—Arnold Rosenthal
Attorney, Agent, or Firm—Michael J. Striker

[57] ABSTRACT

An electrohydraulic pressure-regulating valve has a valve housing formed with a chamber and with an intake passage and an outlet passage opening at spaced-apart locations into the chamber, a valve member in the chamber between these locations and formed with a bore through which fluid can flow between the locations, this bore forming adjacent the outlet passage with a valve seat, a valve body in the chamber engageable with the valve seat to block flow through the bore, and means for urging the body against the seat. The valve has a laminar flow throttle in the bore between the seat and the intake passage. With this system substantially greater noise and vibration reduction is achieved in the range about 400 Herz than has been hitherto possible. Since the throttle is constituted as a laminar-flow throttle and is positioned immediately upstream of the valve body and valve seat, it only makes a nominal pressure drop, so that it does not interfere with operation of the valve.

7 Claims, 3 Drawing Figures

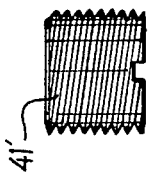
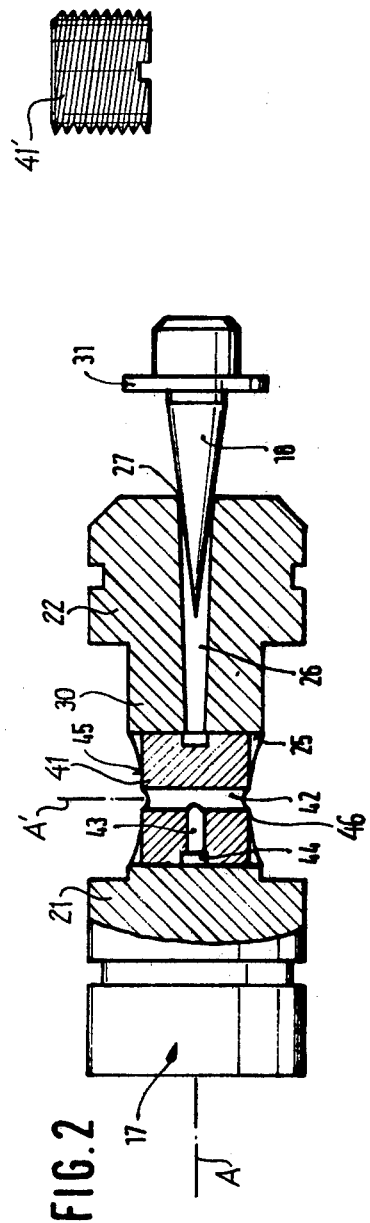
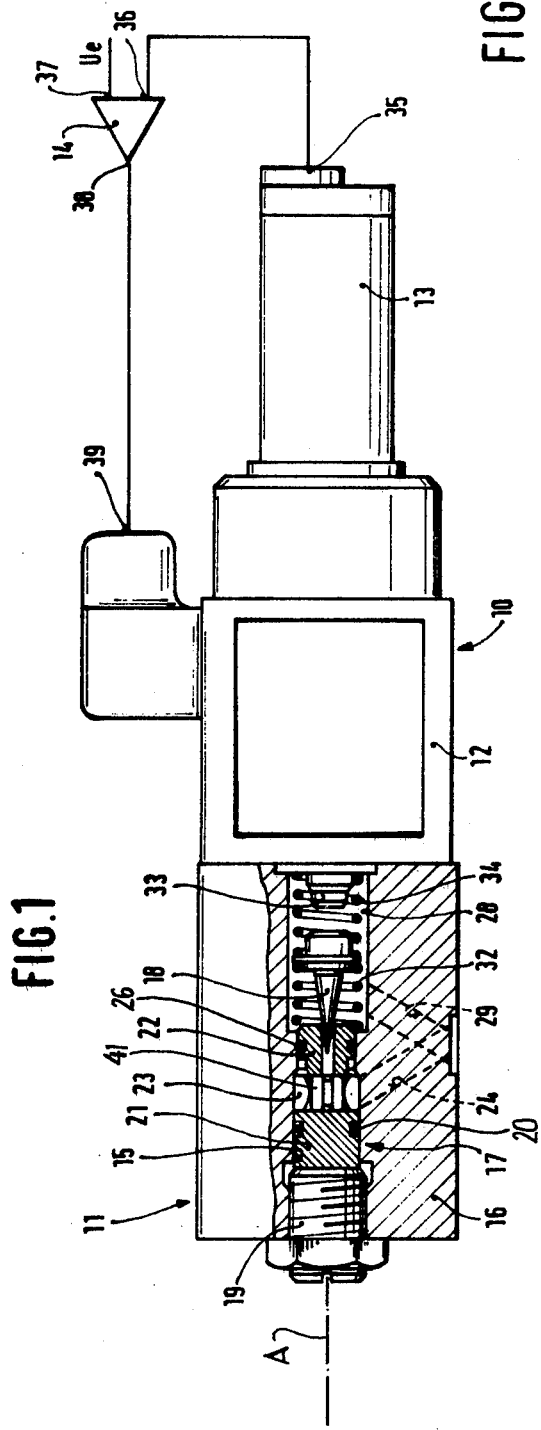

ELECTROHYDRAULIC PRESSURE-REGULATING VALVE

FIELD OF THE INVENTION

The present invention relates to an electrohydraulic pressure-regulating valve, that is a valve which opens at a pressure determined by its electrical energization.

BACKGROUND OF THE INVENTION

An electrohydraulic pressure-regulating valve is known, as for example from German published patent application No. 2,701,580, having a valve housing formed with a chamber and with an intake passage and an outlet passage opening at spaced-apart locations into the chamber. A valve body is provided in this chamber between these locations and is centered on a valve axis and formed with an axially throughgoing bore through which fluid can flow between these locations. This bore forms adjacent the outlet opening a valve seat for a valve body which is engageable with the valve seat to block flow through the bore. A solenoid acting through a spring urges this valve body against the seat with a force proportional to the electrical energization of the solenoid. Thus such a valve has a pressure threshhold that can be set electrically.

Such valves are frequently quite noisy. Fluid flow through them and past the spring-mounted valve body is usually fairly turbulent. This noise level, particularly in the 400-Herz range has been found to be quite annoying. In addition the vibration that creates this noise is transmitted through the various hydraulic lines to other equipment, where it can cause premature wear and loosening of critical parts.

OBJECTS OF THE INVENTION

It is therefore an object of the present invention to provide an improved pressure-regulating valve, in particular one of the above-described electrohydraulic type.

Another object is the provision of such a valve which is largely free of the above-discussed vibration problem.

SUMMARY OF THE INVENTION

These objects are attained according to the instant invention in an electrohydraulic pressure-regulating valve of the above-described general type, that is having a valve housing formed with a chamber and with an intake passage and an outlet passage opening at spaced-apart locations into the chamber, a valve member in the chamber between these locations are formed with a bore through which fluid can flow between the locations, this bore forming adjacent the outlet passage with a valve seat, a valve body in the chamber engageable with the valve seat to block flow through the bore, and means for urging the body against the seat. According to this invention, the valve has a laminar flow throttle in the bore between the seat and the intake passage. With this system substantially greater noise and vibration reduction is achieved in the range about 400 Herz than has been hitherto possible. Since the throttle is constituted as a laminar-flow throttle and is positioned immediately upstream of the valve body and valve seat, it only makes a nominal pressure drop, so that it does not interfere with operation of the valve.

According to further features of the invention, the throttle is formed with passages having a total rectified length substantially greater than the largest of the length, width, and thickness of the throttle. In addition the throttle is formed externally as a body of revolution centered on a throttle axis. The valve body itself is centered on a valve axis transverse to the throttle axis and the bore extends along this valve axis. Hence extremely good noise and vibration reduction will be achieved in an extremely small laminar throttle. What is more, it is relatively easy to retrofit an existing electrohydraulic pressure-regulating valve with such a throttle to achieve all the benefits of the system of the instant invention at relatively reduced cost.

More particularly, the throttle is formed with an axially throughgoing passage parallel to the throttle axis, with a transverse passage opening into the axial passage, and with a circumferential outwardly open groove communicating with the bore of the valve body. If, according to this invention, the ends of the axial passage of the throttle are generally equispaced from the intake passage, extremely good vibration and sound suppression are obtained.

The bore is tapered axially away from the valve seat and the valve body is formed with a transversely throughgoing bore crossing its axial bore. The throttle is mounted in this transverse bore and may according to another feature of a variant of this invention be formed as an externally threaded element loosely threaded into this transverse bore.

The circumferential groove of the throttle is of generally the same cross-sectional area as the bore. Both are also of a cross-sectional area smaller than 2 mm$^2$. Normally a bore diameter of about 1 mm is adequate.

DESCRIPTION OF THE DRAWING

The above and other features and advantages will become more readily apparent from the following, reference being made to the accompanying drawing in which:

FIG. 1 is a partly sectional side view of the valve according to the instant invention;

FIG. 2 is a partly sectional large-scale view of a detail of FIG. 1; and

FIG. 3 is a side view of another throttle according to this invention.

SPECIFIC DESCRIPTION

As seen in FIG. 1 an electrohydraulic pressure-regulating valve 10 has a valve part 11, a proportional magnet 12, and a position detector 13. A comparator 14 constituted as a differential amplifier serves to operate the valve 10 in accordance with a set-point signal $U_e$.

The valve part 11 has a housing 16 formed centered on a valve axis A with a bore 15 forming a valve chamber in which is provided an insert 17 engageable with a valve body 18 and held in place by an adjustment screw 19. The insert 17, which actually forms part of the housing 16, has a pair of spaced-apart piston-like portions 21 and 22 sealed by means of O-rings 20 against the interior of the stepped bore 15. The inner piston portion 22 separates an intake chamber 23 into which opens an intake passage 24 from an output chamber 28 into which opens an output passage 29. The housing insert 17 has a small-diameter portion 30 separating these two portions and itself formed with a transversely throughgoing bore 25 centered on a perpendicular axis A'. The portion 22 is formed with an axially centered bore 26 that opens into the bore 25 and that flares frustoconically away from the bore 25.

The valve body 18 as best seen in FIG. 2 is conical to engage the valve seat formed by the rim 27 of the bore 26 in line contact. This body 18 has a flange 31 that engages in one direction a relatively weak spring 32 and in the opposite direction a relatively stiff spring 34 that is oppositely engaged against the end 33 of the core of the proportional magnet 12. The axial spacing of this end 33 from the end of the valve is determined by the electrical energization of the magnet 12. This in turn is determined by the voltage level of the signal fed from the output 38 of the comparator 14 to the input terminal 39 of the magnet 12. The comparator compares the set-point signal $U_e$ which is generated from a variable-voltage source with a voltage fed from an output 35 of the position detector 13 to the other input 36 of the comparator 14. Thus the axial position of this core end 33 will be determined by the level of the signal $U_e$, so that feedback from the output 35 is used to ensure proper positioning.

FIG. 2 further shows how the transverse bore 25 of the housing insert 17 is provided with a laminar flow throttle 41 formed as a body of revolution centered on the axis A' and formed centered on this axis A1 with an axially throughgoing passage or bore 42, a radial passage 43, and a circumferential outwardly open groove 44. The radial passage 43 interconnects the groove 44 and bore 42 and the groove 44 is aligned with the outer end of the bore 26. The body 41 has two ends or faces 45 and 46 at which the bore 42 opens.

The valve assembly described above functions as follows:

When the proportional magnet 12 is not energized the spring 34 is unloaded and the valve body 18 lifts off the seat 27. Fluid can therefore flow from the intake passage 24 into the chamber 23, into both ends of the bore 42, radially along the bore 43, around in the groove 44, axially along the bore 26, into the chamber 28, and out the passage 29.

When the magnet 12 is energized, the spring 34 is loaded with a force proportional to the voltage energizing the coil of the magnet 12 so as to press the valve body 18 against the seat 27 with a corresponding force. Fluid can flow along the above-described path only when it brings to bear on the end of the valve body 18 a force greater than the spring force urging the valve body 18 in the opposite direction against the seat 27.

During fluid flow through the device the throttle 41 damps not only high-frequency vibrations, but relatively mid-range ones in the neighborhood of 400 Herz. None of its bores 42 or 43 and its groove 44 has a diameter greater than 1 mm, or a flow cross section greater than 2 mm², so that the damping effect will be considerable.

It is also possible according to this invention to use the flow body 41' shown in FIG. 3, which is formed with an external thread and no internal bores. Such a throttle 41' is loosely screwed into the bore 25 to allow enough fluid flow around itself for the desired damping effect. Furthermore it is possible for the passage 26 to be of uniform cross-sectional area, that is cylindrical, or even stepped if laminar flow in it is not desired.

I claim:

1. An electrohydraulic pressure-regulating valve comprising:
    a valve housing formed with a chamber and with an intake passage and an outlet passage opening at spaced-apart locations into said chamber;
    a valve member in said chamber between said locations and formed with a longitudinal bore and communicating therewith with a transverse bore through which fluid can flow between said locations, said bores being centered on respective longitudinal and transverse axes and said longitudinal bore forming adjacent said outlet passage a valve seat;
    a valve body in said chamber engageable with said valve seat to block flow through said bores;
    means for urging said body against said seat; and
    a laminar flow throttle in said transverse bore between said seat and said intake passage and formed externally as a body of revolution centered on said transverse axis, said throttle being formed with
        an axially throughgoing passage parallel to said transverse axis,
        a transverse passage transverse to the axial passage and opening thereinto, and
        a circumferential outwardly open groove communicating with said longitudinal bore and transverse passage.

2. The value defined in claim 1 wherein said throttle has a length parallel to said transverse axis and a diameter perpendicular thereto, the passages of said throttle having a total length substantially greater than the largest of said length and diameter of said throttle.

3. The valve defined in claim 1 wherein the ends of said axial passage of said throttle are generally equispaced from said intake passage.

4. The valve defined in claim 1 wherein said longitudinal bore is tapered axially away from said valve seat.

5. The valve defined in claim 1 wherein said circumferential groove is of generally the same cross-sectional area as said bore.

6. The valve defined in claim 1 wherein said longitudinal bore is of a cross-sectional area smaller than 2 mm².

7. The valve defined in claim 1 wherein said transverse passage extends radially of said transverse axis away from said longitudinal bore toward said groove.

* * * * *